US012145820B2

(12) United States Patent
Roberts

(10) Patent No.: US 12,145,820 B2
(45) Date of Patent: Nov. 19, 2024

(54) ELEVATOR SYSTEM INCLUDING A PASSENGER EAR COMFORT APPLICATION

(71) Applicant: Otis Elevator Company, Farmington, CT (US)

(72) Inventor: Randy Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1412 days.

(21) Appl. No.: 16/678,748

(22) Filed: Nov. 8, 2019

(65) Prior Publication Data

US 2021/0139272 A1 May 13, 2021

(51) Int. Cl.
*B66B 1/28* (2006.01)
*B66B 5/00* (2006.01)
*B66B 5/02* (2006.01)

(52) U.S. Cl.
CPC .............. *B66B 1/28* (2013.01); *B66B 5/0012* (2013.01); *B66B 5/02* (2013.01)

(58) Field of Classification Search
CPC ........... B66B 1/28; B66B 5/0012; B66B 5/02; B66B 1/285; B66B 5/0018
See application file for complete search history.

(56) References Cited

U.S. PATENT DOCUMENTS

2009/0152053 A1* 6/2009 Smith ........................ B66B 1/30 187/247
2011/0108368 A1* 5/2011 Yamamoto ............ B66B 11/024 187/293
2013/0292210 A1* 11/2013 Smith ........................ B66B 1/30 187/247

FOREIGN PATENT DOCUMENTS

CN 110228744 A * 9/2019 ......... B66B 11/0226
CN 112057231 A * 12/2020 .............. A61F 11/00
JP 2010269855 A 12/2010
JP 2015202952 A 11/2015
KR 20100134108 A * 12/2010
KR 20190058162 A * 5/2019
WO WO-0073192 A1 * 12/2000 ............... B66B 1/28

OTHER PUBLICATIONS

European Search Report for European Application No. 20206316.0 dated Mar. 26, 2021; 49 pages.

* cited by examiner

*Primary Examiner* — Jeffrey Donels
(74) *Attorney, Agent, or Firm* — CANTOR COLBURN LLP

(57) ABSTRACT

An elevator system includes an elevator car, a pressure sensor, and a controller. The car is adapted to move vertically within a hoistway and defines a passenger compartment adapted to be occupied by at least one passenger. The sensor is configured to measure air pressure in the passenger compartment. The controller is configured to control travel of the elevator car, receive a plurality of pressure signals from the sensor indicative of changing air pressure in the passenger compartment over a prescribed time period, and execute a preprogrammed application configured to apply a current car velocity and the changing air pressure to a preprogrammed ear pressure table. Upon application, the controller outputs a command to reduce the current car velocity if application of the preprogrammed ear pressure table determines a differential ear pressure would otherwise exceed a preprogrammed threshold.

19 Claims, 3 Drawing Sheets

ELEVATOR SYSTEM INCLUDING A PASSENGER EAR COMFORT APPLICATION

BACKGROUND

Exemplary embodiments pertain to the art of elevator systems, and more particularly, to an elevator system including a passenger ear comfort application and method of operation.

Rapid changes in altitude of high-rise, high-speed, elevators result in changes in in-cab pressure that can cause discomfort to riding passengers especially during descending flights due to the pressure differential across the tympanic membrane of the human ear. Such ear pressure differences cause air to flow through the mouth and Eustachian tubes which alleviates the difference but is direction dependent. Descending elevators produce a positive pressure gradient which effectively closes the tubes and makes pressure equalization more problematic. As a result, the descent speed in such elevators is typically reduced to avoid passenger ear discomfort at the cost of increasing flight times.

BRIEF DESCRIPTION

An elevator system according to one, non-limiting, embodiment of the present disclosure includes an elevator car adapted to move vertically within a hoistway, the elevator car defining a passenger compartment adapted to be occupied by at least one passenger; a pressure sensor configured to measure air pressure in the passenger compartment; and a controller configured to control travel of the elevator car, receive a plurality of pressure signals from the pressure sensor indicative of changing air pressure in the passenger compartment over a prescribed time period and execute a preprogrammed application configured to adjust a current car velocity based on the changing air pressure and comparison to a preprogrammed ear pressure table.

Additionally, to the foregoing embodiment, the application is configured to apply the current car velocity and the changing air pressure to the preprogrammed ear pressure table, and output a command to reduce the current car velocity if application of the preprogrammed ear pressure table determines a differential ear pressure would otherwise exceed a preprogrammed threshold.

In the alternative or additionally thereto, in the foregoing embodiment, the preprogrammed application is executed when the elevator car is descending, and the preprogrammed application is not executed when the elevator car is ascending.

In the alternative or additionally thereto, in the foregoing embodiment, the elevator system includes an occupancy sensor configured to determine if the elevator car is occupied and output an occupancy signal to the controller, wherein the preprogrammed application is not executed if the elevator car is not occupied.

In the alternative or additionally thereto, in the foregoing embodiment, the occupancy sensor is at least one of a weight sensor, an imaging sensor, a motion sensor, and an infrared sensor.

In the alternative or additionally thereto, in the foregoing embodiment, the preprogrammed threshold is about 2000 dPA.

In the alternative or additionally thereto, in the foregoing embodiment, the controller includes one or more processors and one or more non-transitory storage mediums, and the preprogrammed ear pressure table, the preprogrammed threshold, and the preprogrammed application are stored in the one or more non-transitory storage mediums and executed by the one or more processors.

A method of operating an elevator system according to another, non-limiting, embodiment includes taking a first measurement of air pressure by a pressure sensor and in a passenger compartment defined by an elevator car and when the elevator car is traveling at a first velocity; taking a second measurement of air pressure in the passenger compartment when the elevator car is traveling at the first velocity and at the expiration of a time period measured from the first measurement; calculating a rate of pressure change in the passenger compartment at the first velocity and from the first and second measurements by a controller; applying the rate of pressure change and the first velocity to a preprogrammed ear pressure table by the controller; associating the application to the preprogrammed ear pressure table to a preprogrammed threshold by the controller; and changing the first velocity to a second velocity based on the association by the controller.

Additionally, to the foregoing embodiment, the method includes descending the elevator car by the controller before calculating the rate of pressure change.

In the alternative or additionally thereto, in the foregoing embodiment, the method includes confirming the elevator car is descending by the controller and to enable the change of the first velocity.

In the alternative or additionally thereto, in the foregoing embodiment, the method includes confirming the elevator car is occupied by the controller, via an occupancy sensor, and to enable the change of the first velocity.

In the alternative or additionally thereto, in the foregoing embodiment, the occupancy sensor is at least one of a weight sensor, an imaging sensor, a motion sensor, and an infrared sensor.

In the alternative or additionally thereto, in the foregoing embodiment, the preprogrammed threshold is about 2000 dPA.

In the alternative or additionally thereto, in the foregoing embodiment, the controller is configured to control travel of the elevator car, and the time period is prescribed.

In the alternative or additionally thereto, in the foregoing embodiment, the preprogrammed application is executed when the elevator car is descending.

In the alternative or additionally thereto, in the foregoing embodiment, the preprogrammed application is not executed when the elevator car is ascending.

In the alternative or additionally thereto, in the foregoing embodiment, the occupancy sensor is configured to determine if the elevator car is occupied and output an occupancy signal to the controller, and wherein the preprogrammed application is not executed if the elevator car is not occupied.

In the alternative or additionally thereto, in the foregoing embodiment, the controller includes one or more processors and one or more non-transitory storage mediums, and the preprogrammed ear pressure table, the preprogrammed threshold, and the preprogrammed application are stored in the one or more non-transitory storage mediums and executed by the one or more processors.

In the alternative or additionally thereto, in the foregoing embodiment, the controller is configured to control travel of the elevator car, and the time period is prescribed.

In the alternative or additionally thereto, in the foregoing embodiment, the preprogrammed application is executed when the elevator car is descending.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term “about” is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

Figure 1:
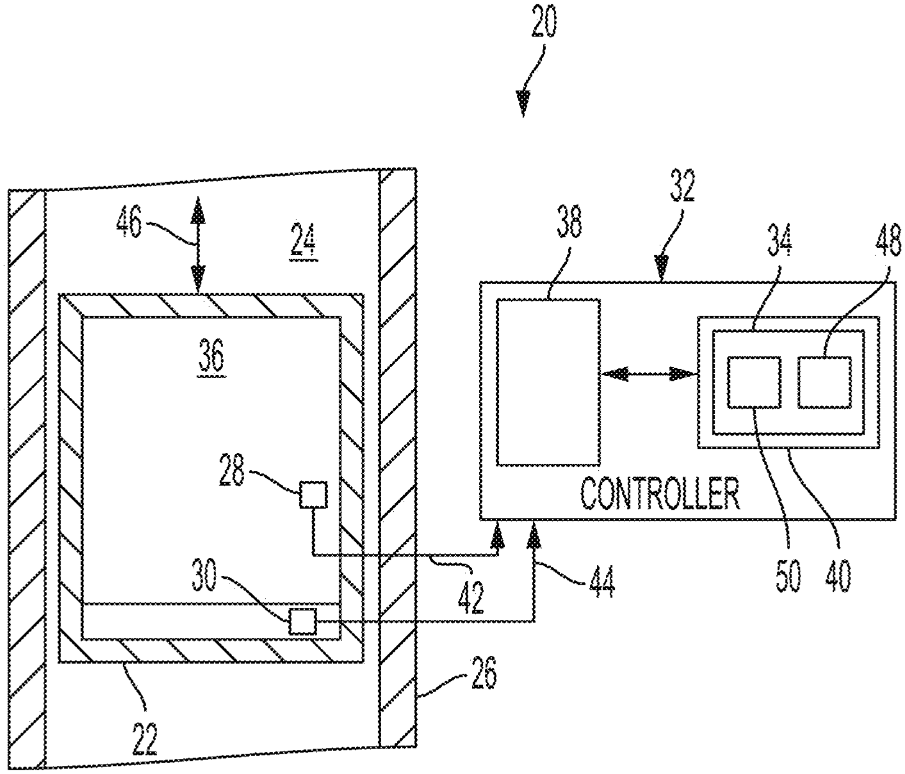
FIG. 1 is a schematic of an exemplary, non-limiting, embodiment of an elevator system of the present disclosure.

Referring to FIG. 1, an exemplary embodiment of an elevator system 20 is illustrated. The elevator system 20 includes an elevator car 22 adapted to move vertically within a hoistway 24 having boundaries defined by a structure or building 26. In general, the hoistway 24 extends in at least a vertical direction, and communicates through a multitude of floors (not shown) of the building 26. Each floor may be associated with at least one landing generally situated adjacent to the hoistway 24.

In an embodiment, the elevator system 20 further includes a pressure sensor 28, an occupancy sensor 30, a controller 32, and an executable ear comfort application 34 (i.e., instructions). The elevator car 22 includes boundaries that define a passenger compartment 36 adapted to be occupied by passenger(s) desiring to travel between floors of the building 26. The air pressure sensor 28 is orientated to measure air pressure in the passenger compartment 36, and in one example, is located in the compartment 36. The occupancy sensor 30 is configured to determine, or detect, the presence of a passenger in the compartment 36. Examples of occupancy sensors 30 include, but are not limited to, weight sensors (i.e., located in, or below a floor of the elevator car 22), image sensors, infrared sensors, motion sensors, and others.

The controller 32 includes at least one processor 38 (e.g., microprocessor), at least one storage medium 40 (e.g., non-transitory) that may be computer readable and writeable. As is known in the art, the controller 32 is configured to control various components (not shown) of the elevator system 20 to propel the elevator car 22 in a controller direction (i.e., up and down, see arrow 46) and at a controlled velocity. The controller 32 is also configured to receive pressure signals (see arrow 42) from the pressure sensor 28, and occupancy signals (see arrow 44) from the occupancy sensor 30. It is further contemplated and understood that the controller 32 may be one, or more, of an elevator controller, a separate controller, a local controller, a cloud server, and others.

The ear comfort application 34 is configured to optimize a balance between elevator car speed and ear comfort of the passenger(s). More particularly, and in one embodiment, the ear comfort application 34 is configured to receive the cabin pressure signals 42 over a prescribed time period and when the elevator car 22 is, in one embodiment, moving downward and at a constant, known, velocity. The application 34 calculates a cabin pressure rate of change and applies the rate of change to an ear pressure table 48 preprogrammed into the storage medium 40. The ear pressure table 48 is reflective of the impact of cabin pressure change rates upon the human ear. For example, the human ear is capable of equalizing pressure at generally known rates, and the data of the table 48 reflects this. The table 48 may be part of the application 34 itself, or a separate table, and can be reprogrammed to assist in optimizing elevator car speed and ear comfort. This optimization includes a preprogrammed threshold 50 that represents the maximum differential pressure placed upon the human ear before discomfort occurs. In one example, the threshold 50 is about 2000 dPa. In one embodiment, the threshold 50 may be greater than or less than 2000 dPa. The threshold 50 may be adjusted (i.e., reprogrammed) to increase comfort by decreasing the threshold 50, or reduce elevator car travel time by increasing the threshold 50.

Figure 2:
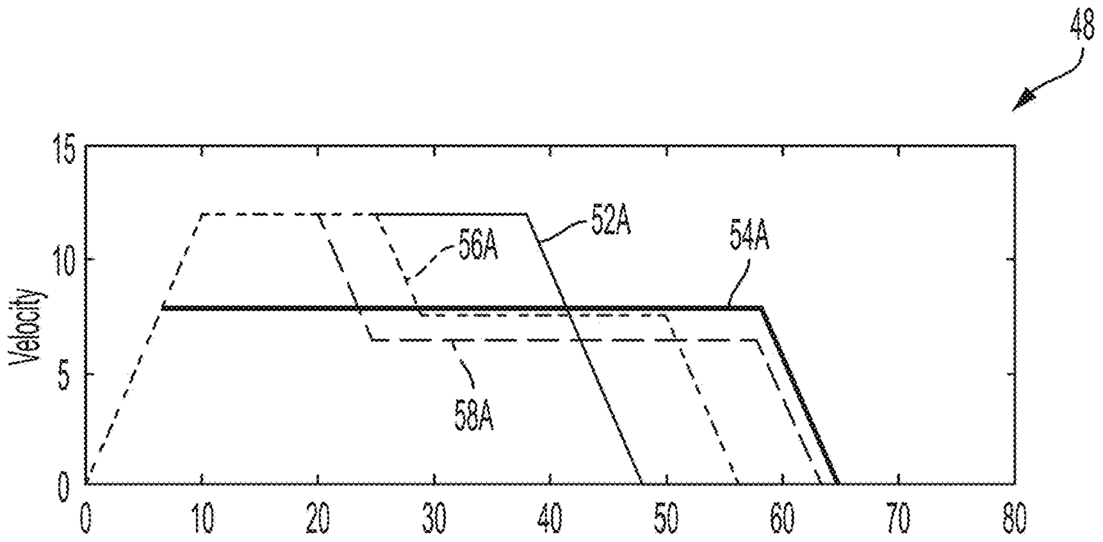
FIG. 2 is a graph depicting elevator car velocity verse time.
Figure 3:
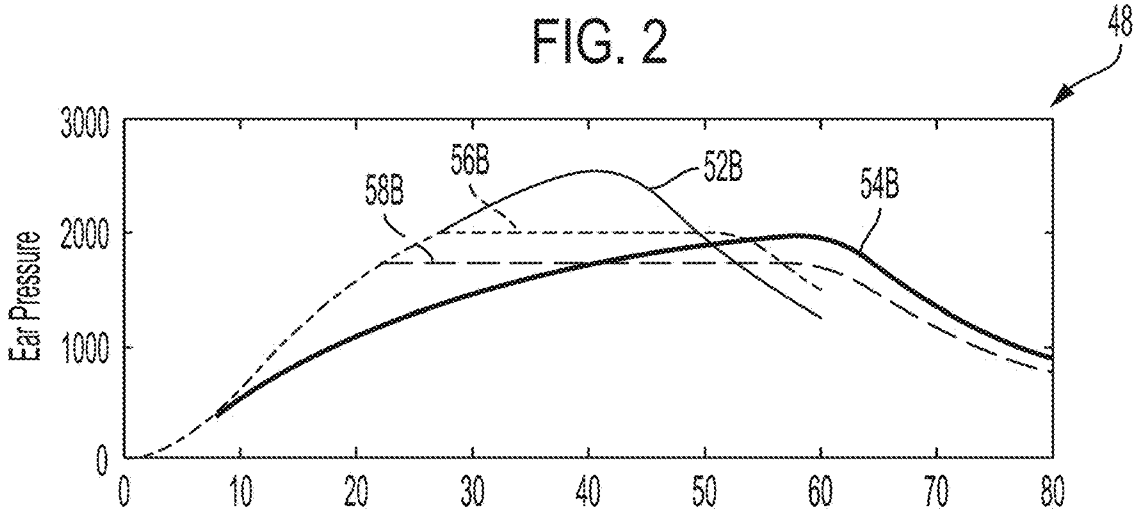
FIG. 3 is a graph depicting ear pressure differential verse time, wherein the time scale corresponds with the time scale of FIG. 2.
Figure 4:
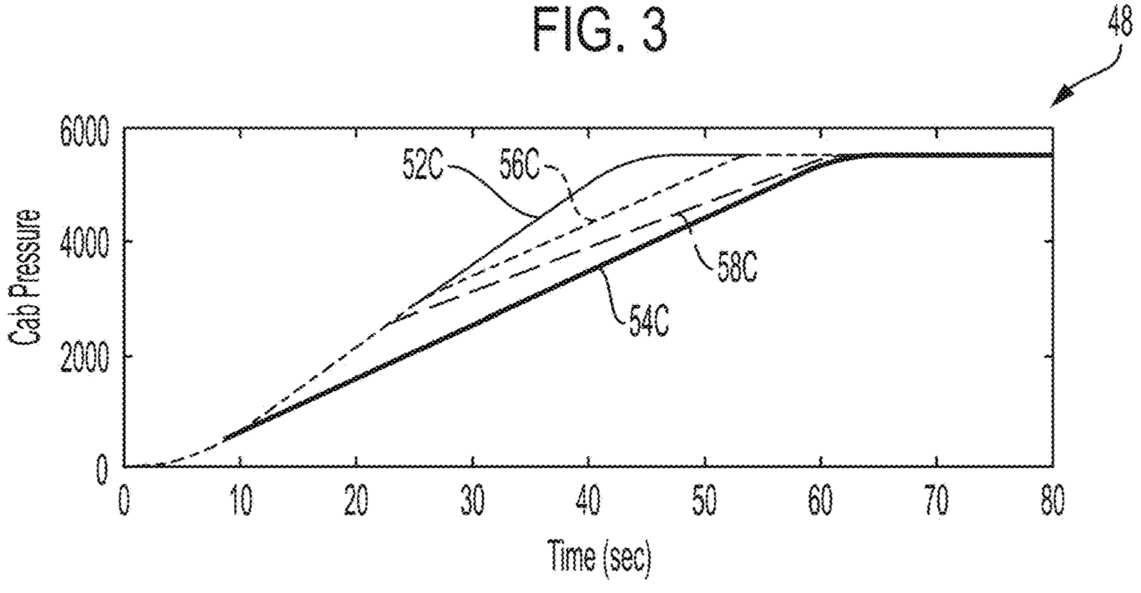
FIG. 4 is a graph depicting air pressure in an elevator car of the elevator system, wherein the time scale corresponds with the time scale of FIG. 2.

The table 48 is best reflected in FIG. 2 as a time in seconds verse car velocity graph with the threshold 50 set at 2000 dPa. For reference purposes, FIG. 3 depicts time in seconds verse ear pressure differential in Pascals (Pa), and FIG. 4 depicts time in seconds verse cabin pressure differential in Pascals. The profile lines 52A, 54B, 56C, 58D to be described in FIG. 2 are each respectively reflected in FIG. 3 as lines 52B, 54B, 56B, 58B, and in FIG. 4 as lines 52C, 54C, 56C, 58C and are for exemplary purposes only.

Profile lines 52A, 54A, represent the conventional state of the art, with profile line 52A illustrating a high velocity condition that will lead to ear discomfort, and profile line 54A may not lead to ear discomfort but requires long travel times. Profile line 52A is represented as a profile that is too severe and will cause ear discomfort because the differential ear pressure is well above 2000 dPa (see line 52B in FIG. 3). The profile line 54A is considered to be a more traditional profile line (i.e., traditional elevator speed) but does not optimize elevator speed and the ear comfort level remains substantially below the threshold 50 (see line 54B in FIG. 3). The profile line 56A in FIG. 2 is considered to be an optimized profile line that maximizes elevator car speed but makes adjustments in time to maintain ear comfort. That is, the ear pressure differential is maintained at or near the threshold 50 for a considerable period of travel time (see line 56B in FIG. 3).

As another example, the profile line 58A in FIG. 2 is considered to be an optimized profile line that maximizes elevator car speed while maintaining ear comfort with a threshold 50 (i.e., ear differential pressure) set at about 1800 dPa. That is, the ear pressure differential is maintained at or near the adjusted threshold 50 for a considerable period of travel time (see line 58B in FIG. 3). Therefore, profile line 56A is representative of the table 48 when the threshold 50 is set at 2000 dPa, and the profile line 58A is representative of the table 48 when the threshold 50 is set at 1800 dPa.

FIG. 4 depicts an example of cabin pressure increases as the elevator car 22 descends. That is, cabin relative pressure of zero is where the elevator car 22 begins a descent, and the cabin relative pressure of 6,000 Pa may be where the elevator car 22 ends the descent. The lines 52C, 54C, 56C, 58C are different from one-another because the velocities are different over the same time scale (see FIG. 2).

Figure 5:
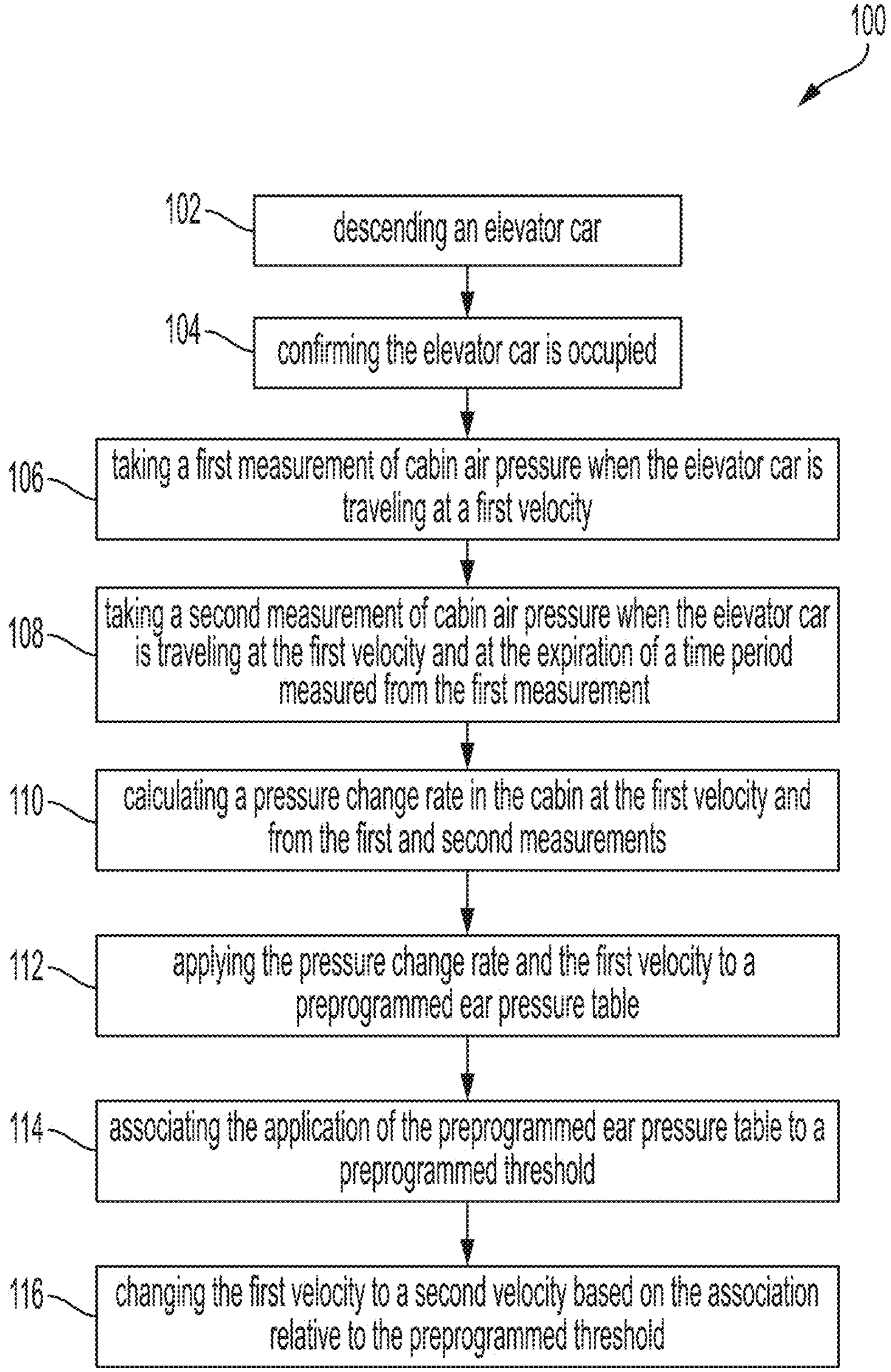
FIG. 5 is a flow chart depicting a method of operating the elevator system.

Referring to FIG. 5, a method 100 of operating the elevator system is illustrated. At block 102, the controller 32 initiates a descent of the elevator car 22. At block 104, the controller 32 confirms the elevator car 22 is occupied via the occupancy sensor 30. At block 106, a first measurement of cabin relative air pressure is taken by the pressure sensor 28 when the elevator car 22 is traveling at a first velocity. It is understood that an absolute pressure is measured, or known, at the initiation of a run and the relative air pressure is relative to the absolute pressure. For example, atmospheric pressure conditions may change between runs thus altering the absolute pressure. At block 108, a second measurement of cabin relative air pressure is taken when the elevator car 22 is traveling at the first velocity, and at the expiration of a time period measured from the first measurement. It is understood that relative air pressure may be taken continuously throughout a run in one example, or may be taken once a second to save, for example, battery power, or may be taken at any other desired interval.

At block 110, the application 34, via the controller 32, calculates a rate of cabin relative pressure change when at the first velocity and from the first and second measurements. That is, the cabin relative pressure changes with car vertical position, and car velocity is the parameter that the controller 32 can change to modify or control upcoming cab relative pressure. At block 112, the application 34, via the controller 32, applies the rate of cabin relative pressure change and the first velocity to a preprogrammed ear pressure table 48. At block 114, the application 32 associates the preprogrammed threshold to a specific preprogrammed ear pressure table. At block 116, the controller 32 facilitates a change from the first elevator car velocity to a second elevator car velocity based on the table 48 and the associated threshold 50.

In this, or other embodiments, it is understood that blocks 102 and 104 may generally appear anywhere in the method 100, but prior to the change in car velocity. For example, blocks 102 and 104 may simply be an enablement step. For example, just prior to slowing down the elevator car 22 to promote ear comfort, the controller 32 may first confirm the car 22 is occupied. If not, there is no reason to slow the car speed.

It is understood that FIG. 5, represents a reactive control approach to controlling the differential ear pressure with sensed signals 42, 44 feeding into and be reacted upon by the controller 34. There may be two calculated parameters: the first is time to switch to a slower speed, and the second is the actual value of the slower speed. Both of these values are dependent on two programmable inputs, or parameters. The first programmable input is the limit on the differential ear pressure (e.g., 1800 Pa), and the second is the apparent ear pressure time constant that is representative of the elevator passenger(s). A third value (i.e., the actual air density during an elevator run) is another variable needed to determine the two control inputs.

In an embodiment, the amount of response, or reactivity, in this reactive control approach could have a range of applications including the ability to:

a) adjust each run independently of any other previous runs,
b) adjust each run independently of any other previous runs, then average over a set of previous runs to reduce the amount of run-to-run variations, or
c) adjust each run independently of any other previous runs, then average over a set of previous runs to reduce the amount of run-to-run variations, then after a predetermined amount of time, freeze the control breakpoints and apply a slow rate of correction to the control breakpoints.

The controller 32, or portions thereof, may be part of, one or more Application Specific Integrated Circuit(s) (ASIC), electronic circuit(s), central processing unit(s) (e.g., microprocessor and associated memory and storage) executing one or more software or firmware programs and routines, combinational logic circuit(s), input/output circuit(s) and devices, appropriate signal conditioning and buffer circuitry, and other components to provide the described functionality.

Software, modules, applications, firmware, programs, instructions, routines, code, algorithms and similar terms mean any controller executable instruction sets including calibrations and look-up tables. The control module, applications, and others may include a set of control routines executed to provide the desired functions. Routines are executed, such as by a central processing unit, and are operable to monitor inputs from sensing devices and other networked control modules, and execute control and diagnostic routines to control operation of actuators and other devices The present disclosure may be a system, a method, and/or a computer program product. The computer program product may include a computer readable storage medium (or media) having computer readable program instructions thereon for causing a processor to carry out aspects of the present disclosure.

The computer readable storage medium(s) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Benefits and advantages include an adaptive control of car motion using cabin pressure sensing that minimizes elevator descent flight times while ensuring passenger ear pressure comfort. This control approach allows for on-site adjustment of the weighting factors (e.g., programmable adjustment of the pressure threshold) that impact the trade-off between flight times and ear pressure differential limits providing a means of customization.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system comprising:

an elevator car adapted to move vertically within a hoistway, the elevator car defining a passenger compartment adapted to be occupied by at least one passenger;

a pressure sensor configured to measure air pressure in the passenger compartment;

a controller configured to control travel of the elevator car, receive a plurality of pressure signals from the pressure sensor indicative of changing air pressure in the passenger compartment over a prescribed time period and execute a preprogrammed application configured to adjust a current car velocity based on the changing air pressure and comparison to a preprogrammed ear pressure table; and an occupancy sensor configured to determine if the elevator car is occupied and output an occupancy signal to the controller, wherein the preprogrammed application is not executed if the elevator car is not occupied.

2. The elevator system set forth in claim 1, wherein the application is configured to apply the current car velocity and the changing air pressure to the preprogrammed ear pressure table, and output a command to reduce the current car velocity if application of the preprogrammed ear pressure table determines a differential ear pressure would otherwise exceed a preprogrammed threshold.

3. The elevator system set forth in claim 2, wherein the preprogrammed application is executed when the elevator car is descending, and the preprogrammed application is not executed when the elevator car is ascending.

4. The elevator system set forth in claim 1, wherein the occupancy sensor is at least one of a weight sensor, an imaging sensor, a motion sensor, and an infrared sensor.

5. The elevator system set forth in claim 2, wherein the preprogrammed threshold is about 2000 dPA.

6. The elevator system set forth in claim 2, wherein the controller includes one or more processors and one or more non-transitory storage mediums, and the preprogrammed ear pressure table, the preprogrammed threshold, and the preprogrammed application are stored in the one or more non-transitory storage mediums and executed by the one or more processors.

7. A method of operating an elevator system comprising:

taking a first measurement of air pressure by a pressure sensor and in a passenger compartment defined by an elevator car and when the elevator car is traveling at a first velocity;

taking a second measurement of air pressure in the passenger compartment when the elevator car is traveling at the first velocity and at the expiration of a time period measured from the first measurement;

calculating a rate of pressure change in the passenger compartment at the first velocity and from the first and second measurements by a controller;

applying the rate of pressure change and the first velocity to a preprogrammed ear pressure table by the controller;

associating the application to the preprogrammed ear pressure table to a preprogrammed threshold by the controller; and changing the first velocity to a second velocity based on the association by the controller.

8. The method set forth in claim 7, further comprising:

descending the elevator car by the controller before calculating the rate of pressure change.

9. The method set forth in claim 7, further comprising:

confirming the elevator car is descending by the controller and to enable the change of the first velocity.

10. The method set forth in claim 7, further comprising:

confirming the elevator car is occupied by the controller, via an occupancy sensor, and to enable the change of the first velocity.

11. The method set forth in claim 10, wherein the occupancy sensor is at least one of a weight sensor, an imaging sensor, a motion sensor, and an infrared sensor.

12. The method set forth in claim 7, wherein the preprogrammed threshold is about 2000 dPA.

13. The method set forth in claim 7, wherein the controller is configured to control travel of the elevator car, and the time period is prescribed.

14. The method set forth in claim 13, wherein the preprogrammed application is executed when the elevator car is descending.

15. The elevator system set forth in claim 14, wherein the preprogrammed application is not executed when the elevator car is ascending.

16. The method set forth in claim 10, wherein the occupancy sensor is configured to determine if the elevator car is occupied and output an occupancy signal to the controller, and wherein the preprogrammed application is not executed if the elevator car is not occupied.

17. The method set forth in claim 7, wherein the controller includes one or more processors and one or more non-transitory storage mediums, and the preprogrammed ear pressure table, the preprogrammed threshold, and the preprogrammed application are stored in the one or more non-transitory storage mediums and executed by the one or more processors.

18. The method set forth in claim 17, wherein the controller is configured to control travel of the elevator car, and the time period is prescribed.

19. The method set forth in claim 18, wherein the preprogrammed application is executed when the elevator car is descending.

* * * * *